United States Patent
Shih

(10) Patent No.: US 11,475,701 B2
(45) Date of Patent: Oct. 18, 2022

(54) FINGERPRINT DISPLAY DEVICE AND INTEGRATION INTEGRATED CIRCUIT AND METHOD FOR DRIVING THE SAME

(71) Applicant: FocalTech Systems Co., Ltd., Hsinchu (TW)

(72) Inventor: Po-Sheng Shih, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 17/355,721

(22) Filed: Jun. 23, 2021

(65) Prior Publication Data

US 2021/0406508 A1  Dec. 30, 2021

Related U.S. Application Data

(60) Provisional application No. 63/046,178, filed on Jun. 30, 2020.

(30) Foreign Application Priority Data

Dec. 18, 2020 (TW) ................................. 109144890

(51) Int. Cl.
| | |
|---|---|
| *G06V 40/12* | (2022.01) |
| *G06V 40/13* | (2022.01) |
| *G09G 3/36* | (2006.01) |
| *G06F 3/041* | (2006.01) |

(52) U.S. Cl.
CPC ........ *G06V 40/1318* (2022.01); *G06F 3/0412* (2013.01); *G06F 3/04166* (2019.05); *G09G 3/3677* (2013.01); *G09G 2300/0408* (2013.01); *G09G 2310/0202* (2013.01)

(58) Field of Classification Search
CPC ............ G06V 40/1318; G06F 3/04166; G06F 3/0412; G09G 3/3677; G09G 2300/0408; G09G 2310/0202
See application file for complete search history.

(56) References Cited

U.S. PATENT DOCUMENTS

| | | | |
|---|---|---|---|
| 2002/0052192 A1* | 5/2002 | Yamazaki | .......... G06V 40/1318 455/410 |
| 2008/0094378 A1* | 4/2008 | Mollov | .................. A61B 6/032 345/204 |

(Continued)

FOREIGN PATENT DOCUMENTS

CN   101467443 A   6/2009

*Primary Examiner* — Stephen G Sherman
(74) *Attorney, Agent, or Firm* — Muncy Geissler Olds & Lowe P.C.

(57) ABSTRACT

A fingerprint display device has plural pixel rows. Each pixel row of n pixel rows in the plural pixel rows has plural display pixel units and plural fingerprint pixel units, where n is an integer greater than 1. The n pixel rows are driven at least by corresponding n display scan lines and n select lines for performing display and fingerprint detection. Each fingerprint pixel unit has a reset end and a select end. The reset end of the fingerprint pixel unit of i-th pixel row among the n pixel rows is connected to a corresponding display scan line among the n display scan lines, and the select end of the fingerprint pixel unit of i-th pixel row among the n pixel rows is connected to a corresponding select line among the n select lines, where i is an index value between 1 and n.

25 Claims, 13 Drawing Sheets

(56) References Cited

U.S. PATENT DOCUMENTS

| | | | |
|---|---|---|---|
| 2008/0297615 A1* | 12/2008 | Kagawa | H04N 5/3765 |
| | | | 348/E3.018 |
| 2010/0091162 A1* | 4/2010 | Chuang | H04N 5/374 |
| | | | 348/308 |
| 2010/0213351 A1* | 8/2010 | Iwamoto | H04N 5/37457 |
| | | | 250/208.1 |
| 2016/0253541 A1* | 9/2016 | Yang | G09G 3/3233 |
| | | | 382/124 |
| 2018/0173923 A1* | 6/2018 | Lee | G06F 3/044 |
| 2019/0079186 A1* | 3/2019 | Taghibakhsh | G01S 15/8918 |
| 2019/0180667 A1* | 6/2019 | Lin | G09G 3/20 |

* cited by examiner

FINGERPRINT DISPLAY DEVICE AND INTEGRATION INTEGRATED CIRCUIT AND METHOD FOR DRIVING THE SAME

CROSS REFERENCE TO RELATED APPLICATION

This application claims the benefit of filing date of U. S. Provisional Application Ser. No. 63/046,178, entitled "Proposal to increase transmittance of three-in-one panel" filed Jun. 30, 2020 under 35 USC § 119(e)(1), and claims the benefits of the Taiwan Patent Application Serial N6 umber 109144890, filed on Dec. 18, 2020, the subject matters of which are incorporated herein by reference.

BACKGROUND

1. Field of the Disclosure

The present disclosure relates to a fingerprint display device and, more particularly, to a fingerprint display device integrating optical fingerprint sensors and a flat display panel, and an integration integrated circuit and method for driving the fingerprint display device.

2. Description of Related Art

FIG. 1 is a schematic diagram illustrating the integration of optical fingerprint sensors and a liquid crystal display (LCD) panel. The fingerprint sensor 11 is disposed, for example, between the thin film transistor layer 12 and the filter substrate layer 13 of the liquid crystal display panel structure, so that the backlight from the reflective layer 14 can be reflected, when projecting on the finger pressed against the glass substrate 15, to the fingerprint sensor 11. Since the reflectivity of the ridge and valley of the fingerprint is different, the fingerprint image can be reconstructed according to the sensing amount of the fingerprint sensor 11.

In order to drive the aforementioned fingerprint sensor for fingerprint recognition on the display panel, it is generally necessary to additionally provide a reset line (RST) and a select line (SEL) for controlling the operation of the fingerprint sensor 11. However, the optical fingerprint sensor 11 is embedded in the pixel of the liquid crystal display panel, and thus the additional reset line and select line may cause the aperture ratio of the liquid crystal display panel to be greatly reduced, resulting in a decrease in display brightness.

Therefore, it is desirable to provide an improved fingerprint display device to mitigate and/or obviate the aforementioned problems.

SUMMARY

An object of the present disclosure is to provide a fingerprint display device and an integration integrated circuit and method for driving the same, whereby the display scan line and the reset line in the fingerprint display device are multiplexed to effectively improve the aperture ratio of the panel.

In one aspect of the present disclosure, there is provided a fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven at least by corresponding n display scan lines and n select lines for performing display and fingerprint sensing, wherein each fingerprint pixel unit has a reset end and a select end, the reset end of the fingerprint pixel unit of i-th pixel row among the n pixel rows is connected to a corresponding display scan line among the n display scan lines, and the select end of the fingerprint pixel unit of the i-th pixel row among the n pixel rows is connected to a corresponding select line among the n select lines, where i is an index value between 1 and n.

In another aspect of the present disclosure, there is provided a method for driving a fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven at least by corresponding n display scan lines and n select lines for performing display and fingerprint sensing, each fingerprint pixel unit having a reset end and a select end, the method comprising: sequentially driving the n display scan lines; and sequentially driving the n select lines, wherein, when driving the i-th display scan line among the n display scan lines, the reset end of the fingerprint pixel unit of a corresponding pixel row among the n pixel rows is activated and, when driving the i-th select line among the n select lines, the select end of the fingerprint pixel unit of a corresponding pixel row among the n pixel rows is activated, where i is an index value between 1 and n.

In still another aspect of the present disclosure, there is provided an integration integrated circuit for controlling a fingerprint display device having a plurality of pixel rows, in which each pixel row of n pixel rows among the plurality of pixel rows has a plurality of display pixel units and a plurality of fingerprint pixel units, where n is an integer greater than 1, the n pixel rows are driven at least by corresponding n display scan lines and n select lines for performing display and fingerprint sensing, each fingerprint pixel unit has a reset end and a select end, the reset end of the fingerprint pixel unit of i-th pixel row among the n pixel rows is connected to a corresponding display scan line among the n display scan lines, and the select end of the fingerprint pixel unit of the i-th pixel row among the n pixel rows is connected to a corresponding select line among the n select lines, where i is an index value between 1 and n, so as to sequentially drive the display scan lines for performing display, and sequentially drive the select lines for performing fingerprint sensing in cooperation with driving of the display scan lines.

Other objects, advantages, and novel features of the disclosure will become more apparent from the following detailed description when taken in conjunction with the accompanying drawings.

DETAILED DESCRIPTION

The following embodiments describe the implementation and operation principles of the present disclosure. Those skilled in the art to which the present disclosure pertains may understand the features and effects of this disclosure through the aforementioned embodiments, and may perform combination, modification, replacement or adaption based on the spirit of the present disclosure.

Figure 1:
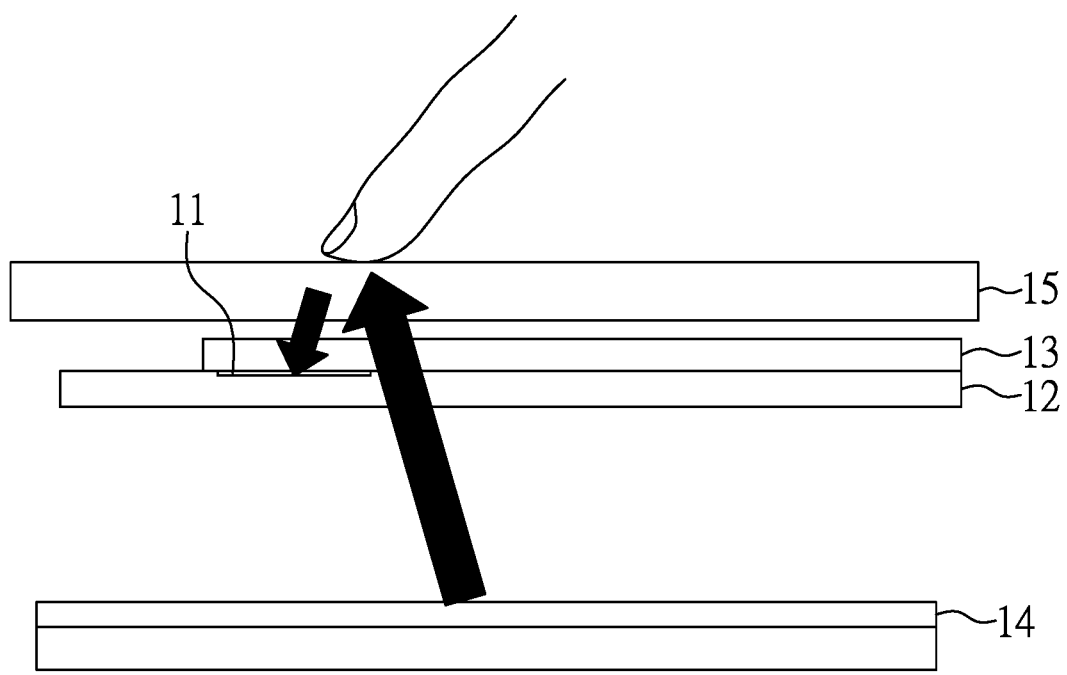
FIG1 is a schematic diagram illustrating the integration of optical fingerprint sensors and a liquid crystal display panel.
Figure 2A:
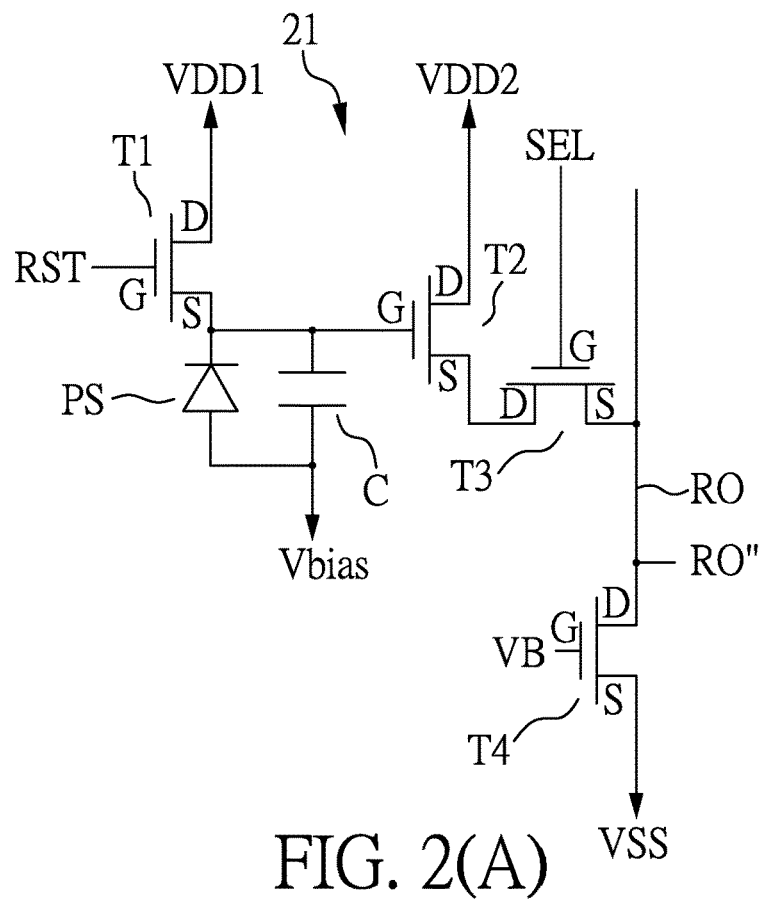
FIG. 2(A) is a circuit diagram of an optical fingerprint pixel unit.

FIG. 2 (A) is a circuit diagram of an optical fingerprint pixel unit 21, which is a three-transistor (3T) fingerprint pixel circuit. The fingerprint pixel unit 21 is implemented by a reset transistor T1, a drive transistor T2, a select transistor T3, a photo sensor PS and a capacitor C, and an array composed of a plurality of fingerprint pixel units 21 constitutes a fingerprint sensor. In the array composed of a plurality of fingerprint pixel units, the fingerprint pixel units 21 of the same column share a load transistor T4, such as the load transistor T4 connected to the fingerprint pixel unit 21 shown in FIG. 2(A). In addition, the transistors T1~T4 shown in FIG. 2(A) are NMOS transistors, but the present disclosure is not intended to be so limited. It is conceivable that the transistors T1~T4 may be other types of MOS transistors, such as PMOS transistors. Each transistor T1~T4 has a control end and two connection ends. For MOS transistors, the control end is a gate (G), and the two connection ends are a drain (D) and a source (S). Optionally, the reset transistor T1 may be in the form of a dual gate. Furthermore, the aforementioned reset transistor T1, drive transistor T2 or select transistor T3 is not limited to a single transistor, and may be two transistors connected in series with two control ends connected together.

In the aforementioned optical fingerprint pixel unit 21 of FIG. 2(A), the control end (G) of the reset transistor T1 is connected to the reset line RST, and the two connection ends (D, S) thereof are respectively connected to a first voltage VDD1 and the optical sensor PS. The control end (G) of the drive transistor T2 is connected to the connection end (S) of the reset transistor T1 and the optical sensor PS, and the two connection ends (D, S) thereof are respectively connected to a second voltage VDD2 and the connection end (D) of the select transistor T3, wherein the first voltage VDD1 and the second voltage VDD2 may be the same DC voltage source or different DC voltage sources. The control end (G) of the select transistor T3 is connected to the select line SEL, and the two connection ends (D, S) thereof are respectively connected to the connection end (S) of the drive transistor T2 and the readout line RO. The two ends of the capacitor C are respectively connected to the control end (G) of the drive transistor T2 and a bias voltage Vbias. The capacitor C may be a capacitor structure formed by the internal components of the optical sensor PS, or a capacitor structure additionally configured, or a combination thereof. The two ends of the optical sensor PS are respectively connected to the connection end (S) of the reset transistor T1 and the bias voltage Vbias. The control end (G) of the load transistor T4 is connected to a fifth voltage VB, and the two connection ends (D, S) thereof are respectively connected to the readout line RO and a sixth voltage VSS.

With the aforementioned optical fingerprint pixel unit 21 of FIG. 2(A), the fingerprint sensing operation can be performed as follows. Firstly, the reset line RST is driven to turn on the reset transistor T1, and the terminal voltage of the capacitor C is reset to a predetermined value, that is, the first voltage VDD. Then, the reset transistor T1 is turned off, so that the optical sensor PS continues to be exposed for a period of time and, with the variation of the illumination intensity and exposure time, the discharge amount of the capacitor C is different, so that the terminal voltage of the capacitor C is also different. When a predetermined exposure time is reached, the select line SEL is driven to turn on the select transistor T3, so that the drive transistor T2 outputs current to the readout line RO, wherein the magnitude of the output current is related to the voltage of the end of the capacitor C connected to the control end (G) of the drive transistor T2, that is, related to the illumination intensity and exposure time. The load transistor T4 connected to the readout line RO is equivalent to an active load, and thus the voltage of the readout end RO" of the readout line RO is related to the reset transistor T1 and the resistance of the active load.

Accordingly, the illumination intensity can be determined by using an integrated circuit to read the voltage of the readout end RO".

Figure 2B:
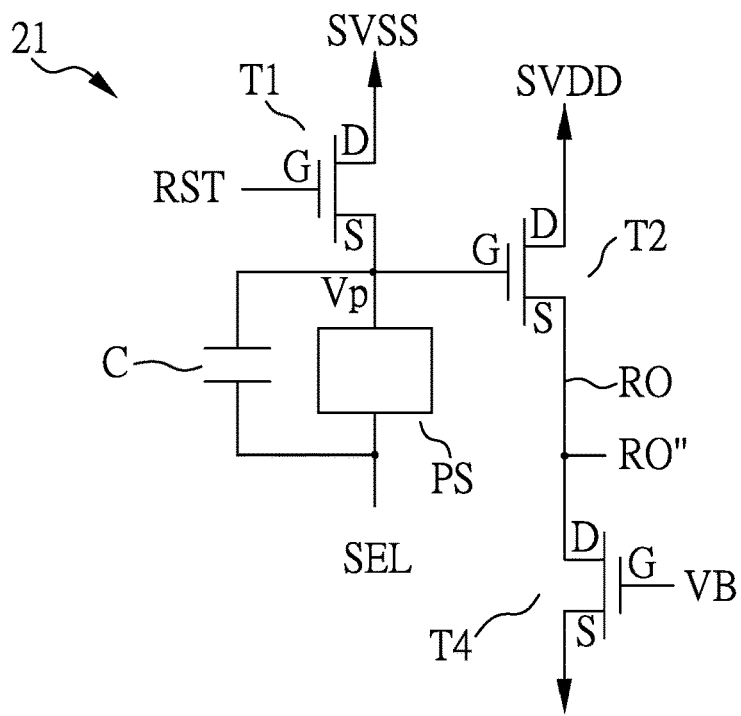
FIG. 2(B) is a circuit diagram of another optical fingerprint pixel unit.

FIG. 2 (B) is a circuit diagram of another optical fingerprint pixel unit 21, which is a two-transistor (2T) fingerprint pixel circuit. The fingerprint pixel unit 21 is implemented by a reset transistor T1, a drive transistor T2, a photo sensor PS and a capacitor C, and an array composed of a plurality of fingerprint pixel units 21 constitutes a fingerprint sensor. In the array composed of a plurality of fingerprint pixel units 21, the fingerprint pixel units 21 of the same row share a load transistor T4, such as the load transistor T4 connected to the fingerprint pixel unit 21 shown in FIG. 2(B). In addition, the transistors T1, T2 and T4 shown in FIG. 2(B) are NMOS transistors, but the present disclosure is not intended to be so limited. It is conceivable that the transistors T1, T2 and T4 may be other types of transistors, such as PMOS transistors. Each of the transistors T1, T2 and T4 has a control end and two connection ends. For MOS transistors, the control end is the gate (G), and the two connection ends are the drain (D) and the source (S). Optionally, the reset transistor T1 may be in the form of a dual gate. Furthermore, the aforementioned reset transistor T1 or drive transistor T2 is not limited to a single transistor, and may be two transistors connected in series with the control ends connected together.

In the aforementioned optical fingerprint pixel unit 21 of FIG. 2(B), the control end (G) of the reset transistor T1 is connected to the reset line RST, and the two connection ends (D, S) thereof are respectively connected to a third voltage SVSS and the optical sensor PS. The control end (G) of the drive transistor T2 is connected to the connection end (S) of the reset transistor T1 and the optical sensor PS, and the two connection ends (D, S) thereof are respectively connected to a fourth voltage SVDD and the readout line RO. The two ends of the optical sensor PS are respectively connected to the connection end (S) of the reset transistor T1 and the control end (G) of the drive transistor T2, and the selection line SEL. The two ends of the capacitor C are also respectively connected to the connection end (S) of the reset transistor T1 and the control end (G) of the drive transistor T2, and the select line SEL. The capacitor C may be a capacitor structure formed by the internal components of the optical sensor PS or a capacitor structure additionally configured, or a combination thereof. The control end (G) of the load transistor T4 is connected to a fifth voltage VB, and the connection end (D) thereof is connected to the sensing line RO.

With the optical fingerprint pixel unit 21 of FIG. 2(B), the fingerprint sensing operation is performed as follows. Firstly, the reset line RST is driven to turn on the reset transistor T1, and the terminal voltage Vp of the capacitor C is reset to a predetermined value, that is, the third voltage SVSS, whereby the third voltage SVSS ensures that the drive transistor T2 is turned off. Then, the reset transistor T1 is turned off, so that the optical sensor PS continues to be exposed for a period of time. With the variation of the illumination intensity and the exposure time, the discharge amount of the capacitor C is different, and thus the terminal voltage Vp of the capacitor C is also different. When a predetermined exposure time is reached, the select line SEL is driven to switch the voltage of the select line SEL from low level to high level (voltage difference ΔV) and, because of the coupling effect, the terminal voltage Vp of the capacitor C will also increase by ΔV, so the drive transistor T2 can be turned on to output current to the readout line RO. The magnitude of the output current is related to the terminal voltage Vp of the capacitor C, that is, related to the illumination intensity and the exposure time. The load transistor T4 connected to the readout line RO is equivalent to an active load. Therefore, the voltage of the readout end RO" of the readout line RO is related to the reset transistor T1 and the resistance of the active load. Accordingly, the illumination intensity can be determined by using an integrated circuit to read the voltage of the read end RO".

Figure 3:
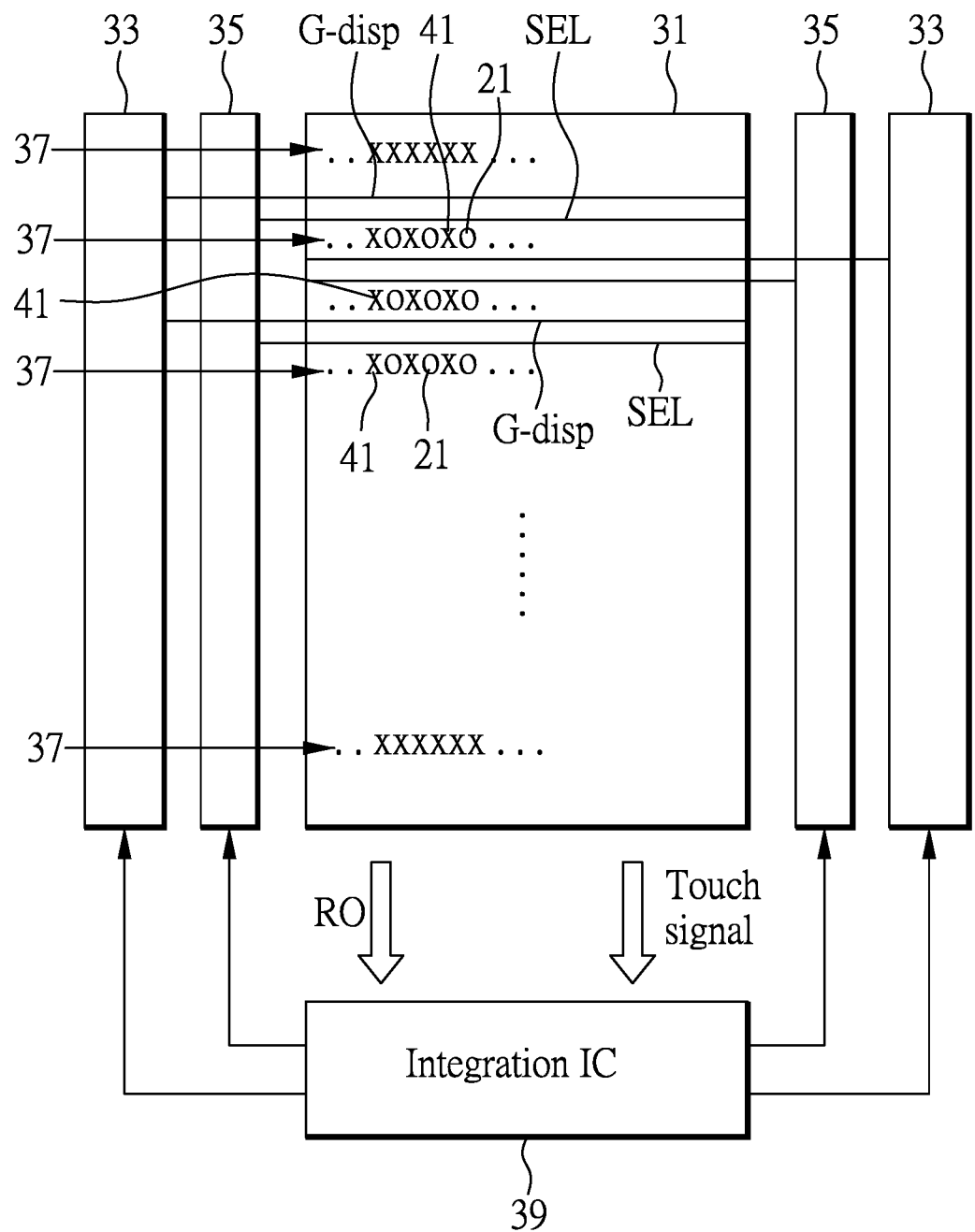
FIG. 3 shows a system structure of the fingerprint display device of the present disclosure.

In order to avoid the problem that the aperture ratio of the display panel is greatly reduced due to additional arrangement of the reset line RST and the select line as shown in FIGS. 2(A) and 2(B), in one embodiment of the fingerprint display device of the present disclosure, the display scan line and the reset line RST in the same row are multiplexed so as to eliminate the use of one reset line for an optical fingerprint pixel unit. Please refer to FIG. 3 showing a system structure of the fingerprint display device of the present disclosure, in which there is GOA (gate on array) circuit 33 for display gate driving provided on the left and right sides of a panel 31 for sequentially driving the display scan lines G-disp to perform display according to the control signal of an integration integrated circuit 39. In addition, in order to realize the fingerprint sensing function, there is GOA circuit 35 for fingerprint sensing driving provided on the left and right sides of the panel 31 for sequentially driving the select lines SEL according to the control signal of the integration integrated circuit 39 so as to perform fingerprint sensing in cooperation with the driving of the display scan lines G-disp. The sensed fingerprint data is read from the readout line RO to the integration integrated circuit 39 for performing fingerprint recognition. Specifically, in the practical circuit, after extending out of the panel 31, the readout line RO may be multiplexed with a data line by a multiplexer for connection to the integration integrated circuit 39 through one line, so as to save the number of pins of the integration integrated circuit 39. In the present disclosure, the panel 31 can be any type of flat display panel, such as an LCD panel or an OLED panel. Although the GOA circuit 33 for display gate driving and the GOA circuit 35 for fingerprint sensing driving are both disposed on the left and right sides of the panel 31 as shown in this embodiment, the present disclosure is not limited to this. In other embodiments, the GOA circuit 33 for display gate driving and the GOA circuit 35 for fingerprint sensing driving may be arranged on the same side of the panel 31, or the GOA circuit 33 for display gate driving is arranged on one side of the panel 31, and the GOA circuit 35 for fingerprint sensing driving is arranged on the opposite side of the panel 31. In addition, the panel 31 of the fingerprint display device of the present disclosure may provide a touch sensing function. For example, by dividing the common electrode of the panel 31 into touch sensors (not shown), the touch sensing function can be realized by using the touch sensors to sense the touch of the user's finger and send the touch signal to the integration integrated circuit 39 for touch detection, wherein the use of divided common electrode as touch sensors is known to those skilled in the art, and thus a detailed description is deemed unnecessary. That is, in one embodiment, the present disclosure may provide an electronic device with three-in-one functions including fingerprint sensing, touch sensing and display, an integration integrated circuit that can be used to drive the electronic device, and a driving method thereof.

FIG. 3 shows that the fingerprint display device of the present disclosure has a plurality of pixel rows 37. Among the plurality of pixel rows 37, there are n pixel rows 37 provided for display and fingerprint recognition functions, where n is an integer greater than 1. That is, each pixel row 37 of the n pixel rows 37 has a plurality of display pixel units 41 and a plurality of fingerprint pixel units 21, and the n pixel rows 37 are driven at least by n display scan lines G-disp and n select lines SEL for performing display and fingerprint sensing. In one embodiment, the number of display pixel units 41 in a pixel row 37 is the same as the number of fingerprint pixel units 21. However, the present disclosure is not limited to this. In other embodiments, the number of fingerprint pixel units 21 in a pixel array 37 may be less than the number of display pixel units 41. In addition, the pixel arrays 37 in the entire display area of the panel 31 have display pixel units 41 and fingerprint pixel units, or the pixel rows 37 in only a portion of the display area, e.g. one third of the display area, have display pixel units 41 and fingerprint pixel units 21, while the pixel rows 37 in the remaining display area only have display pixel units 41.

Figure 4:
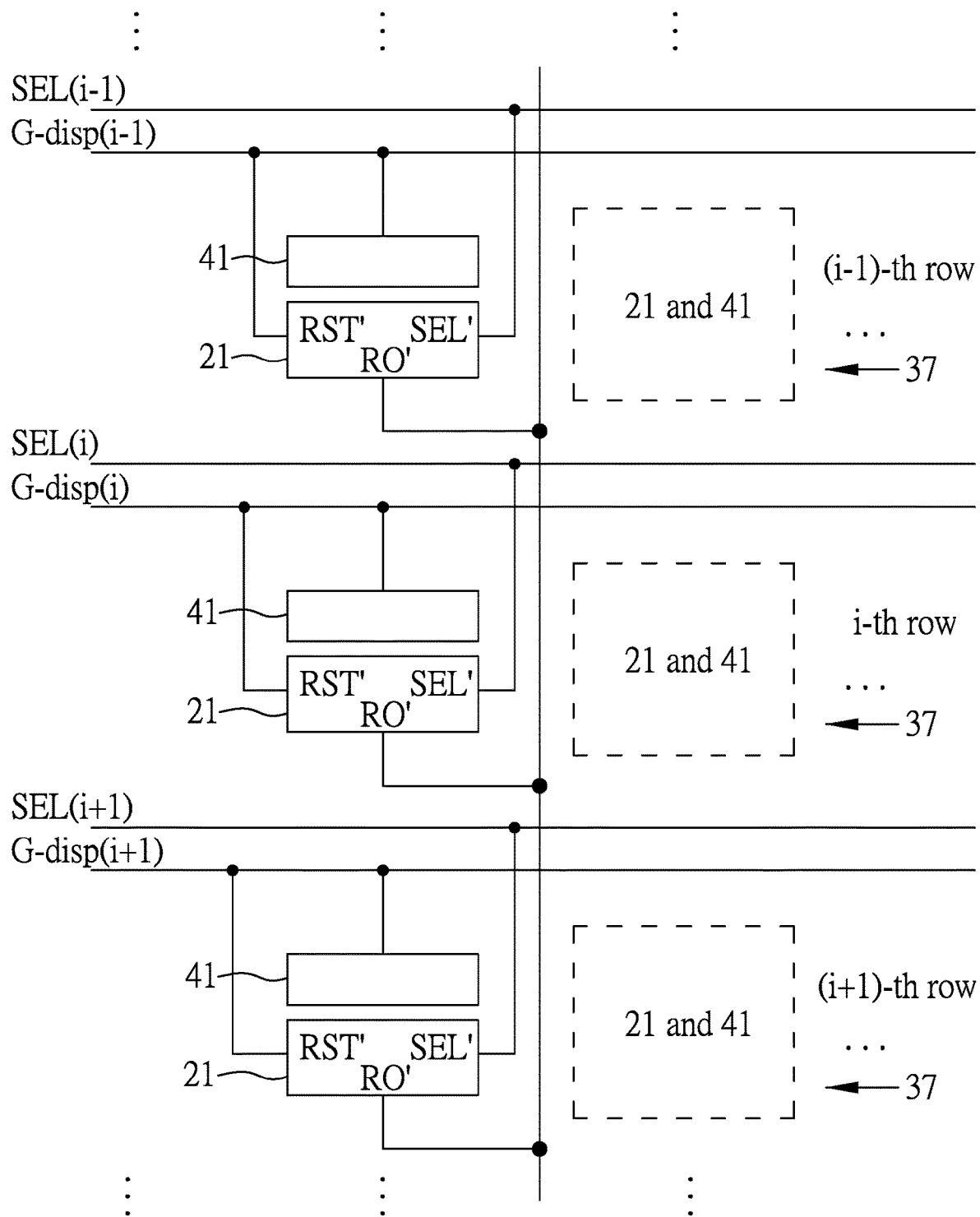
FIG. 4 schematically shows the pixel rows including (i−1)-th row, i-th row and (i+1)-th row in the fingerprint display device of the present disclosure.

Please also refer to FIG. 4 which schematically shows the (i−1)-th, i-th and (i+1)-th pixel rows 37 of the n pixel rows 37 in the fingerprint display device, wherein the pixel row 37 has the display pixel units 41 and the fingerprint pixel units 21 as shown in FIG. 2(A) or 2(B). In FIG. 4, a display pixel unit 41 in a pixel row 37 is shown to correspond to a fingerprint pixel unit 21, and this is only for convenience of description but not limitation. The display pixel units 41 of the same pixel row 37 are connected to the same display scan line G-disp, and the fingerprint pixel units 21 of the same pixel row 37 are connected to the same display scan line G-Disp and the select line corresponding to said pixel row 37. Accordingly, the n pixel rows 37 are driven at least by corresponding n display scan lines G-disp and n select lines SEL for performing display and fingerprint sensing. Each fingerprint pixel unit 21 has a reset end RST' and a select end SEL'. The reset end RST' of the fingerprint pixel unit 21 of the i-th pixel row among the n pixel rows 37 is connected to a corresponding display scan line G-disp. In the example of FIG. 4, the corresponding display scan line G-disp is the i-th display scan line G-disp (i) among the n display scan lines G-disp, but the present disclosure is not limited to this. In practical applications, the corresponding display scan line G-disp can be any display scan line G-disp among the n display scan lines G-disp, for example, display scan line G-disp(i+1) or G-disp(i−1), etc., as long as the reset ends RST' of the fingerprint pixel units 21 of the n pixel rows are respectively connected to the corresponding display scan lines G-disp in sequence. The select ends SEL' of the fingerprint pixel units 21 of the i-th pixel row among the n pixel rows 37 is connected to a corresponding select line SEL. In the example of FIG. 4, the corresponding select line SEL is the i-th select line SEL(i) among the n select lines SEL, but the present disclosure is not limited thereto. In practical applications, the corresponding select line SEL may be any select line SEL among the n select lines SEL, for example, select line SEL(i+1) or SEL(i−1), etc., as long as the select ends SEL' of the fingerprint pixel units 21 of the n pixel rows are respectively connect to the corresponding select lines SEL in sequence, where i is an index value between 1 and n. Accordingly, with the fingerprint display device of the present disclosure, the i-th display scan line G-disp(i) among the n display scan lines G-disp is used to drive the display pixel units 41 of the i-th pixel row among the n pixel rows 37 for display, and the i-th display scan line G-disp(i) among the n display scan lines G-disp and the i-th select line SEL(i) among the n select lines SEL are used to drive the reset end RST' and the select end SEL' of the fingerprint pixel unit 21 of the i-th pixel row among the n pixel rows 37 for performing fingerprint sensing.

Figure 5A:
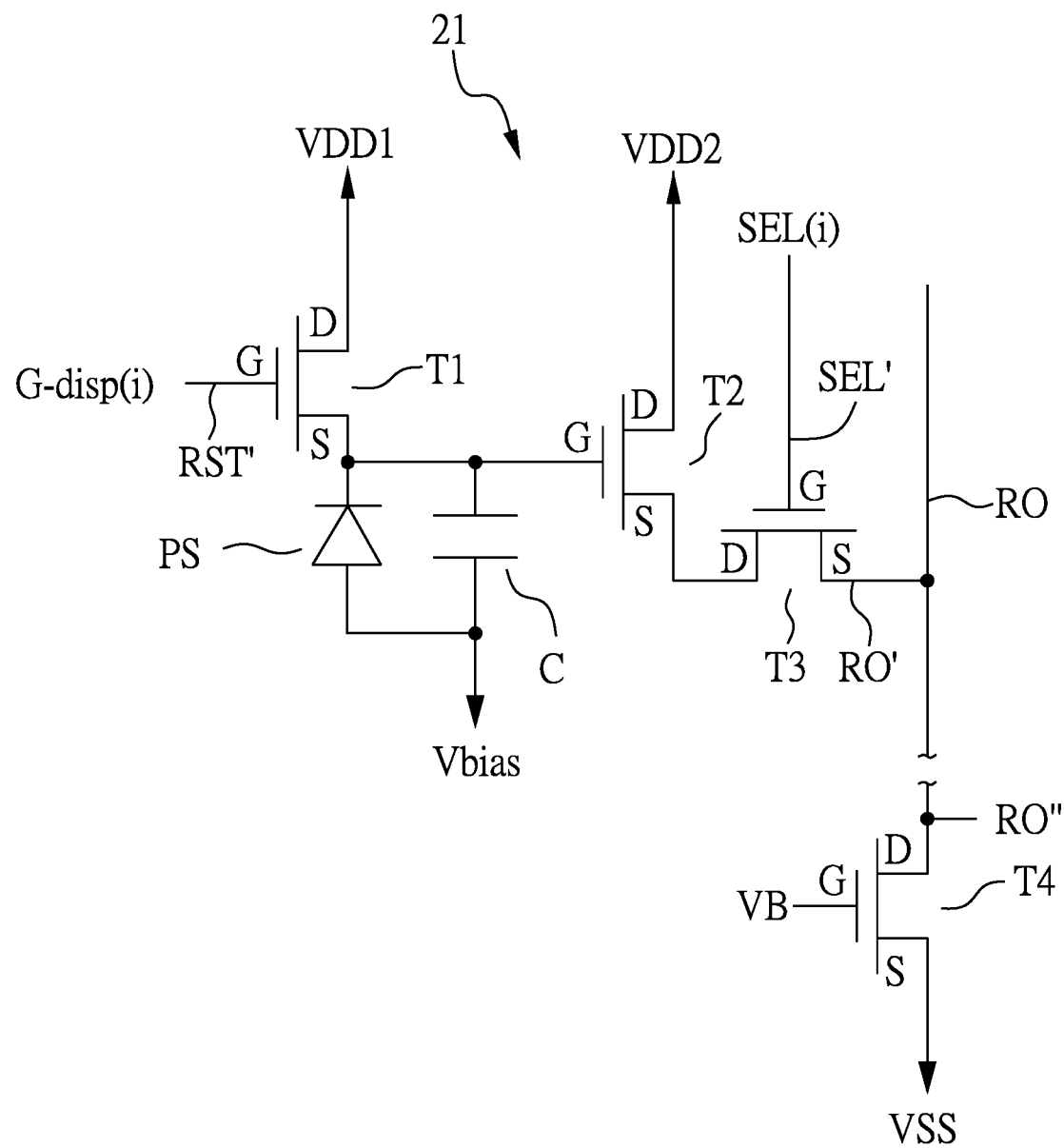
FIG. 5(A) is a circuit diagram of the fingerprint pixel unit of i-th pixel row according to an embodiment of the present disclosure.

Please also refer to FIG. 5(A) showing a circuit diagram of the fingerprint pixel unit 21 of the i-th pixel row among the n pixel rows 37. The reset transistor T1 has a control end (G), a first connection end (D) and a second connection end (S), in which the control end (G) is used as a reset end RST' and connected to the related display scan line G-disp, that is, the i-th display scan line G-disp(i) among the n display scan lines G-disp, and the first connection end (D) is connected to a first voltage VDD1. The drive transistor T2 has a control end (G), a first connection end (D) and a second connection end (S), in which the control end (G) is connected to the second connection end (S) of the reset transistor T1, and the first connection end (D) is connected to a second voltage VDD2, where the first voltage VDD1 and the second voltage VDD2 can be the same DC voltage source or different DC voltage sources. The select transistor T3 has a control end (G), a first connection end (D) and a second connection end (S), in which the control end (G) is used as the select end SEL' and connected to the i-th select line SEL(i) among the n select lines SEL, the first connection end (D) is connected to the second connection end (S) of the drive transistor T2, and the second connection end (S) is used as the readout end RO' and connected to the readout line RO. The photo sensor PS has two ends respectively connected to the second connection end (S) of the reset transistor T1 and a bias voltage Vbias. The capacitor C has two ends respectively connected to the control end (G) of the drive transistor T2 and the bias voltage Vbias. In one embodiment, the capacitor C may be a capacitor structure formed by internal components of the photo sensor PS, but it is not limited to this.

It can be seen from FIG. 5(A) that the present disclosure is capable of multiplexing the display scan line G-disp and the reset line RST, so as to drive a pixel row in a manner of reducing one driving line thereby improving the aperture ratio of the panel. The display scan lines G-disp and the select lines SEL in the entire fingerprint sensor array are driven in sequence. When driving the display scan line G-disp(i), the reset transistor T1 of the fingerprint pixel unit 21 of the i-th pixel row among the n pixel rows is turned on to reset the voltage level of the capacitor C and, when driving the select line SEL(i), the select transistor T3 is turned on to read the fingerprint signal, so as to achieve the effect of fingerprint sensing.

Figure 5B:
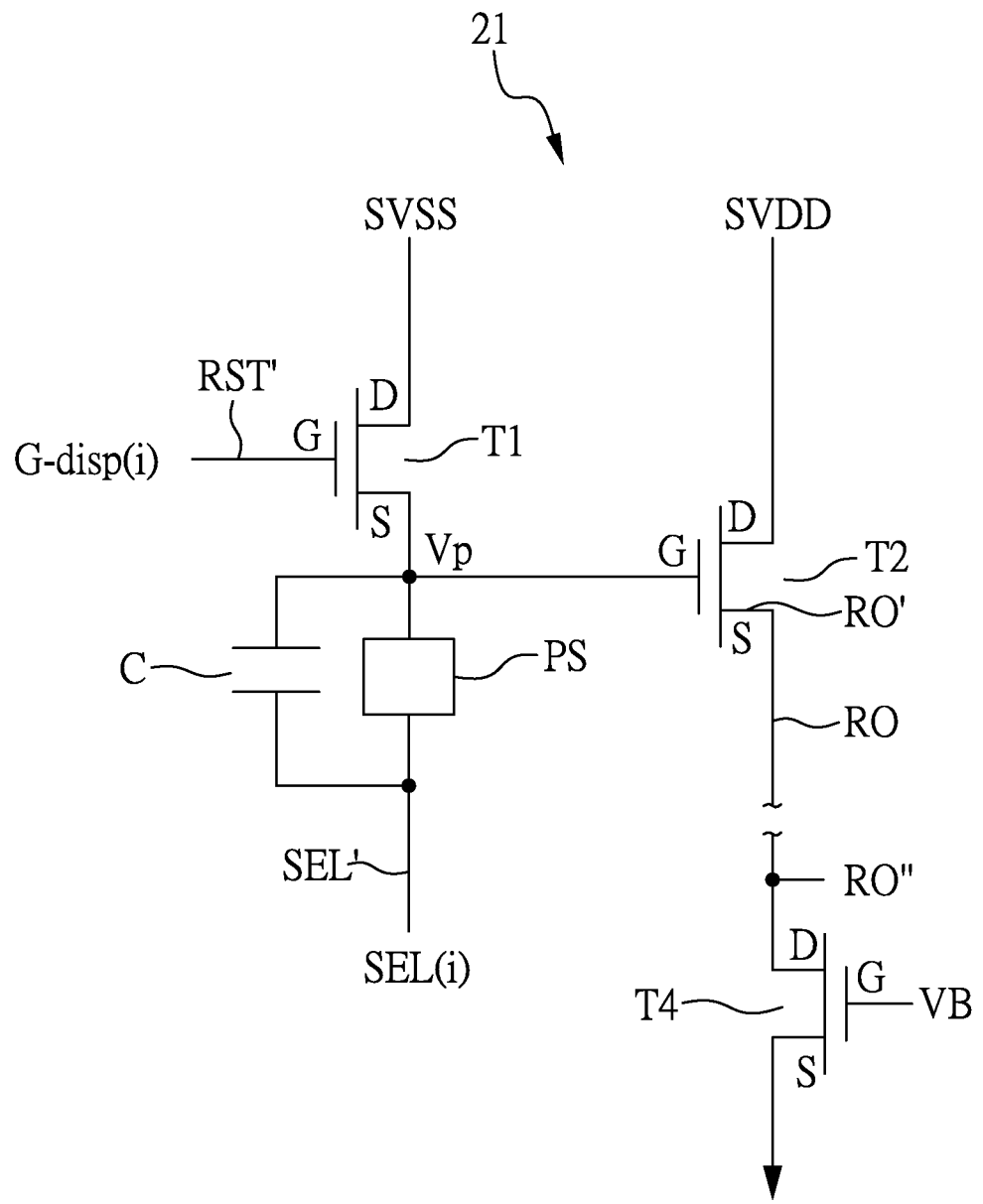
FIG. 5(B) is another circuit diagram of the fingerprint pixel unit of i-th pixel row according to an embodiment of the present disclosure.

FIG. 5(B) is another circuit diagram of the fingerprint pixel unit 21 of the i-th pixel row. The reset transistor T1 has a control end (G), a first connection end (D) and a second connection end (S), in which the control end (G) is used as a reset end RST' and connected to the related display scan line G-disp, that is, the i-th display scan line G-disp(i) among the n display scan lines G-disp, and the first connection end (D) is connected to a third voltage SVSS. The drive transistor T2 has a control end (G), a first connection end (D) and a second connection end (S), in which the control end (G) is connected to the second connection end (S) of the reset transistor T1, the first connection end (D) is connected to the fourth voltage SVDD, and the second connection end (S) is used as a readout end RO' and is connected to the readout line RO. The photo sensor PS has a first end and a second end, in which the first end is connected to the second connection end (S) of the reset transistor T1, and the second end is used as the select end SEL' and connected to the i-th select line SEL(i) among the n select lines SEL. The capacitor C has two ends respectively connected to the control end (G) of the drive transistor T2 and the second end of the photo sensor PS. In one embodiment, the aforementioned capacitor C may be a capacitor structure formed by internal components of the photo sensor PS, but it is not limited to this.

It can be seen from FIG. 5(B) that the present disclosure is capable of multiplexing the display scan line G-disp and the reset line RST, so as to drive a pixel row in a manner of reducing one driving line thereby improving the aperture ratio of the panel. The display scan lines G-disp and the select lines SEL in the entire fingerprint sensor array are driven in sequence. When driving the display scan line G-disp(i), the reset transistor T1 of the fingerprint pixel unit 21 of the i-th pixel row among the n pixel rows is turned on to reset the voltage level of the capacitor C and, when driving the select line SEL(i), power is supplied to the photo sensor PS so as to increase the voltage level of the select end SEL' thereby turning on the drive transistor T2 to read the fingerprint signal and thus achieving the function of fingerprint sensing.

Figure 6A:
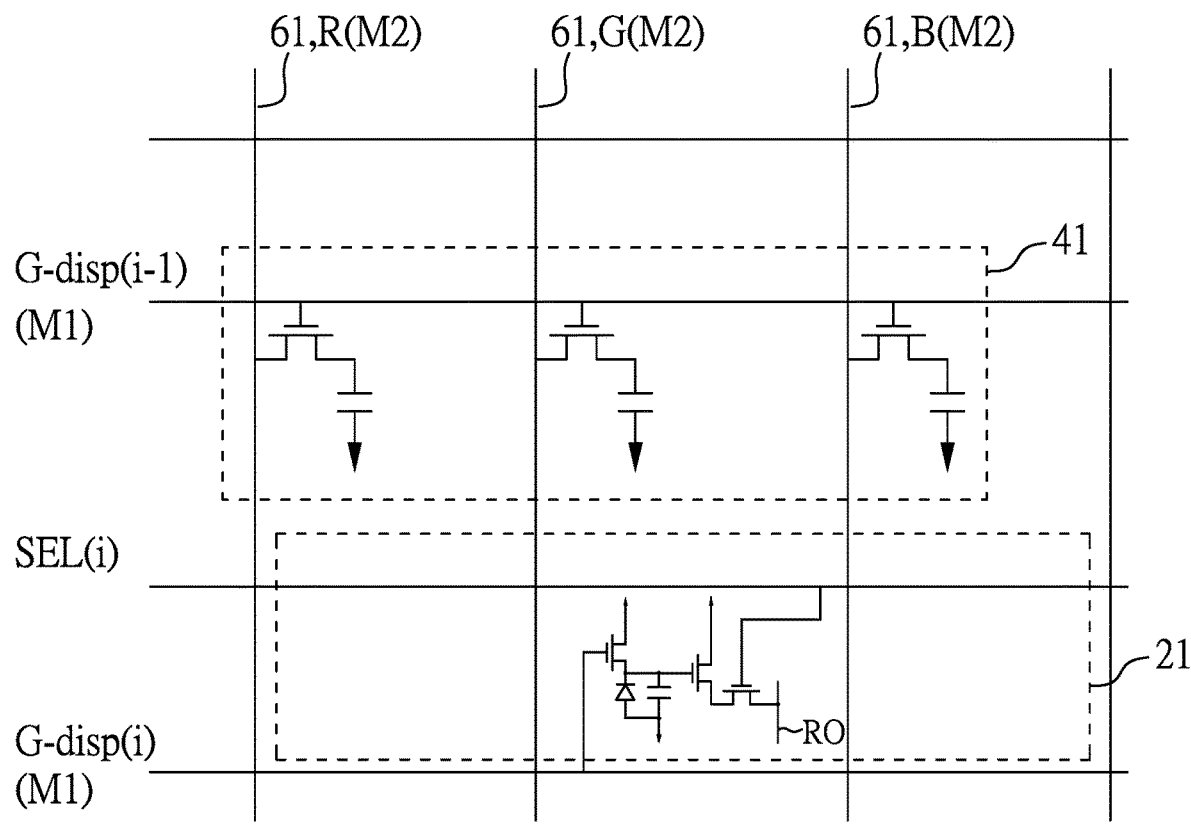
FIG. 6(A) is a schematic diagram of the fingerprint pixel unit of FIG. 5(A) integrated into the display pixel unit of the present disclosure.
Figure 6B:
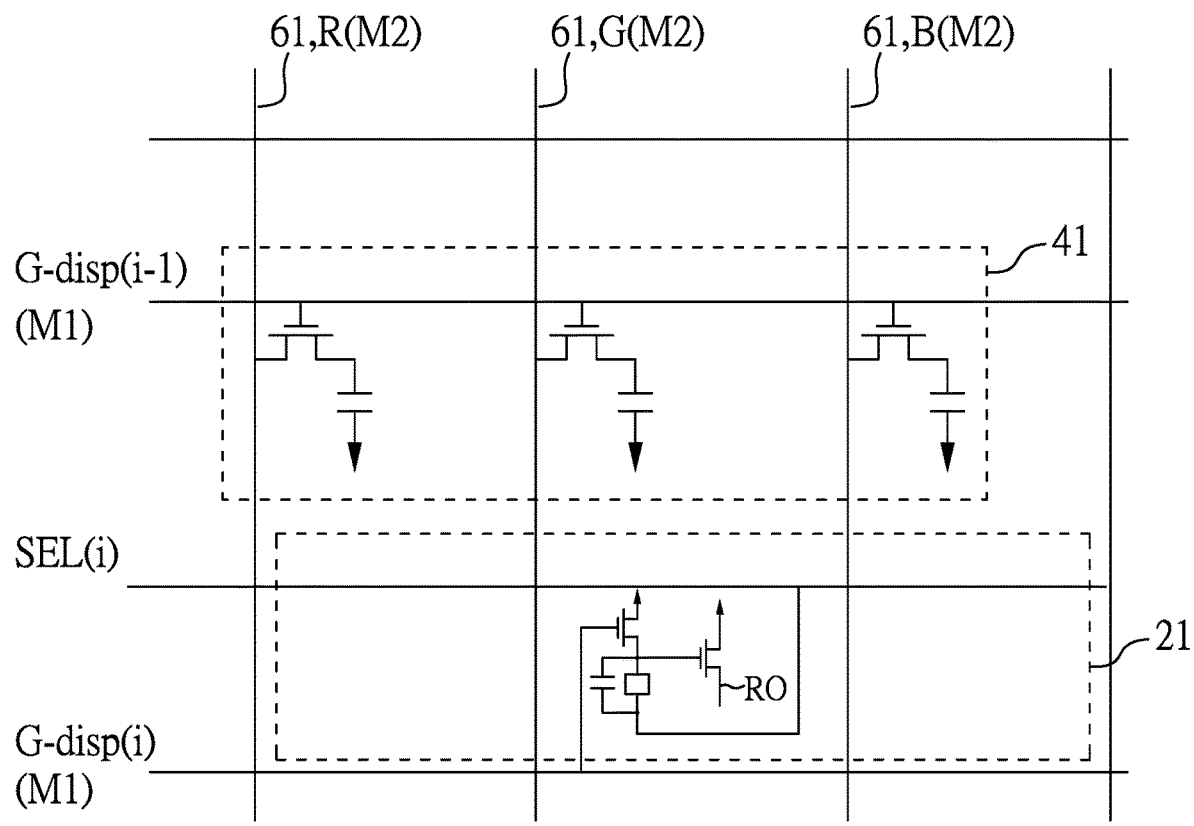
FIG. 6(B) is a schematic diagram of the fingerprint pixel unit of FIG. 5(B) integrated into the display pixel unit of the present disclosure.

FIG. 6(A) is a schematic diagram of the fingerprint pixel unit 21 of FIG. 5(A) integrated into the display pixel unit 41 of the present disclosure, and FIG. 6(B) is a schematic diagram of the fingerprint pixel unit 21 of FIG. 5(B) integrated into the display pixel unit 41 of the present disclosure. As shown in FIG. 6(A) and FIG. 6(B), the display pixel unit 41 includes three R/G/B sub-pixels of LCD is integrated with a fingerprint pixel unit 21. The circuit area of the fingerprint pixel unit 21 is arranged in the area below the three R/G/B sub-pixels, but this is only an example and not a limitation. It is conceivable that the circuit area of the fingerprint pixel unit 21 may be concentrated to be arranged in the area below a specific sub-pixel. In addition, in this embodiment, an LCD panel is taken as an example, but the present disclosure is not limited to this. The present disclosure is also applicable to other types of panels such as OLED, or to other types of pixel arrangements such as RGBW. Although the display pixel unit 41 and the fingerprint pixel unit 21 in FIG. 6 belong to different pixel rows, they may belong to the same pixel row in other embodiments. In the present disclosure, the fingerprint pixel units 21 are arranged among the R/G/B sub-pixels of multiple display pixel units 41 while whether they belong to the same row or not can be adjusted according to the design requirement, and the present disclosure is not limited to this.

In the embodiment of FIG. 6, the LTPS LCD manufacturing process is taken as an example. The display scan lines G-disp and the select lines SEL are made of metal-1 layer (M1). The data lines 61 connected to the three R/G/B sub-pixels are made of metal-2 layer (M2), which are marked as R(M2), G(M2), and B(M2) in FIG. 6(A) and FIG. 6(B). The data lines 61 are provided to send display data to each display sub-pixel.

Figure 7:
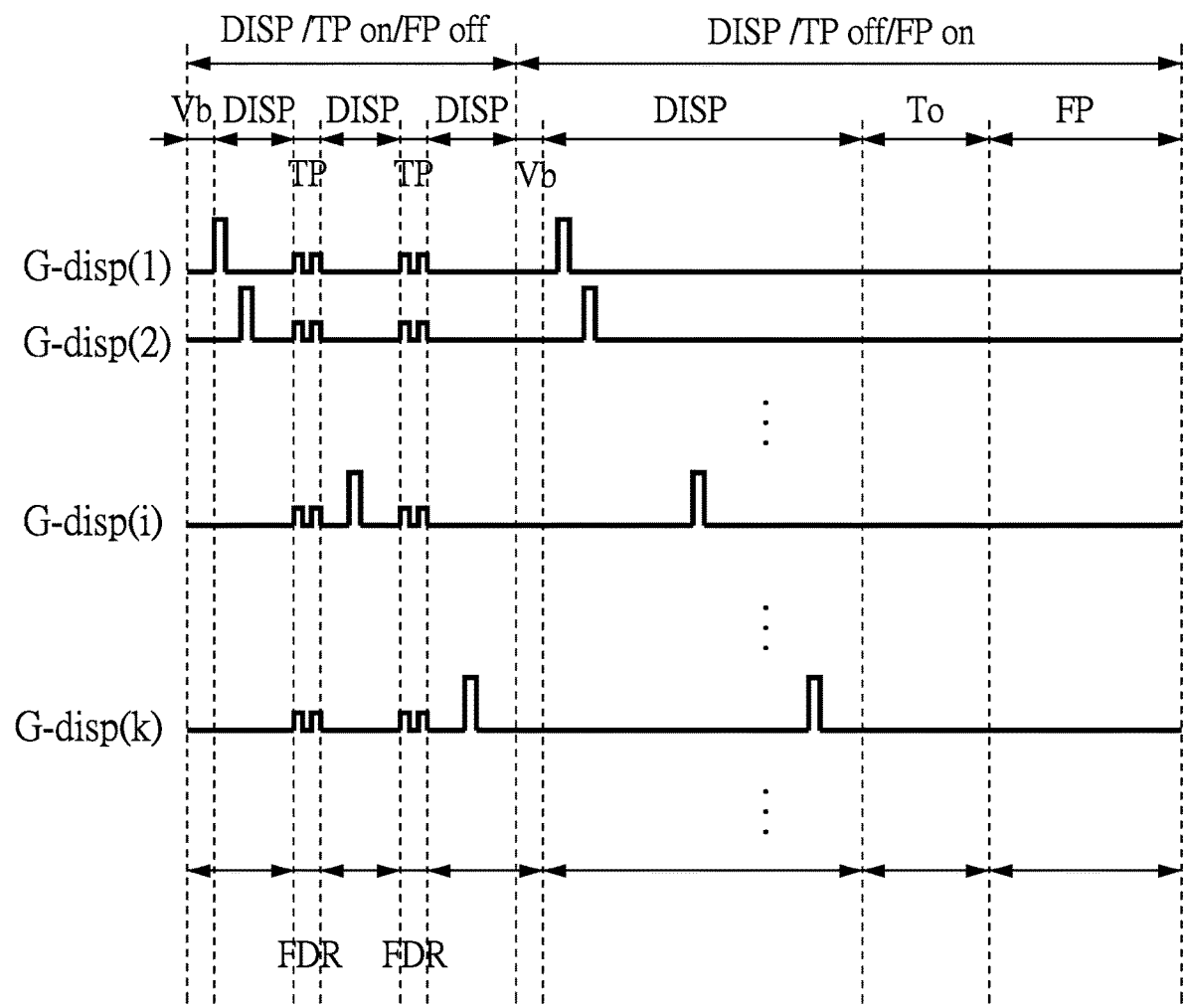
FIG. 7 is a timing diagram of display scan lines of the fingerprint display device according to the present disclosure.

FIG. 7 is a timing diagram of the display scan line G-disp of the fingerprint display device of the present disclosure. The fingerprint display device of this embodiment includes the functions of display, touch, and fingerprint sensing. In FIG. 7, DISP stands for display, TP stands for touch, FP stands for fingerprint sensing, and T0 stands for a time interval. As shown, when fingerprint sensing is not activated (FP off), display driving and touch sensing are performed in a time-sharing manner. During the touch period, a full drive signal as same as the signal that drives touch electrodes is sent to the display scan line G-disp; that is, the voltage swing, phase, and frequency of the full drive signal are substantially the same as the signal that drives touch electrodes so as to reduce the load of the touch electrodes. When the fingerprint sensing is activated (FP on) and the touch sensing is deactivated (TP off), during the display period, in addition to updating the display data, the fingerprint pixel unit 21 is also reset at the same time, while the magnitude of the time interval T0 between the display period and fingerprint sensing period depends on the exposure time required by the fingerprint pixel unit 21, which can be at least zero.

Figure 8:
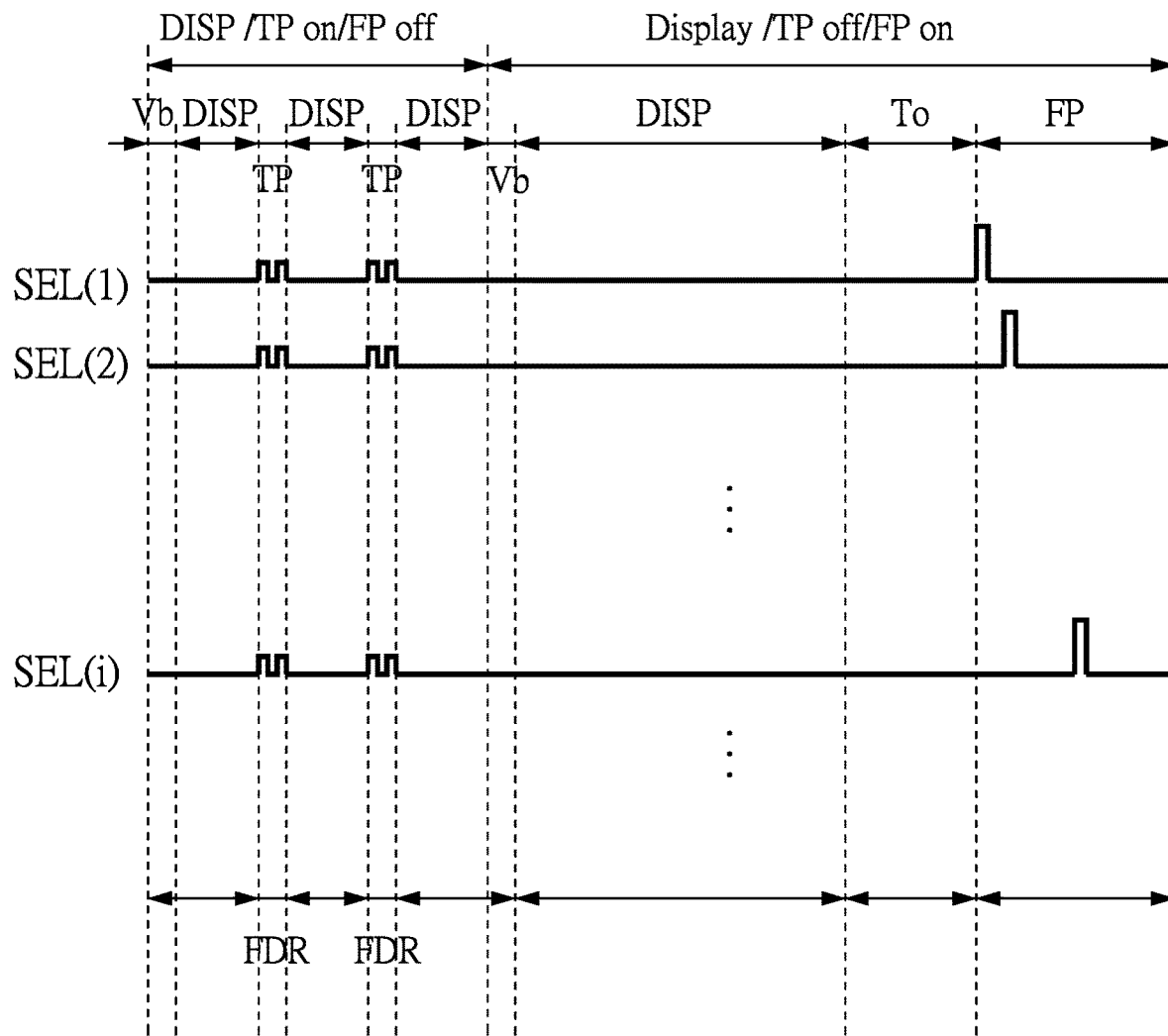
FIG. 8 is another timing diagram of display scan lines of the fingerprint display device according to the present disclosure.

FIG. 8 is a timing diagram of the select line SEL of the fingerprint display device of the present disclosure. In FIG. 8, DISP stands for display, TP stands for touch, FP stands for fingerprint sensing, and T0 stands for a time interval. As shown, when fingerprint sensing is not activated (FP off), during the touch period, a full drive signal as same as the signal that drives touch electrodes is sent to the select line SEL so as to reduce the load of the touch electrodes. When the fingerprint sensing is activated (FP on) and the touch sensing is deactivated (TP off), during the fingerprint sensing period, fingerprint data can be read.

Figure 9A:
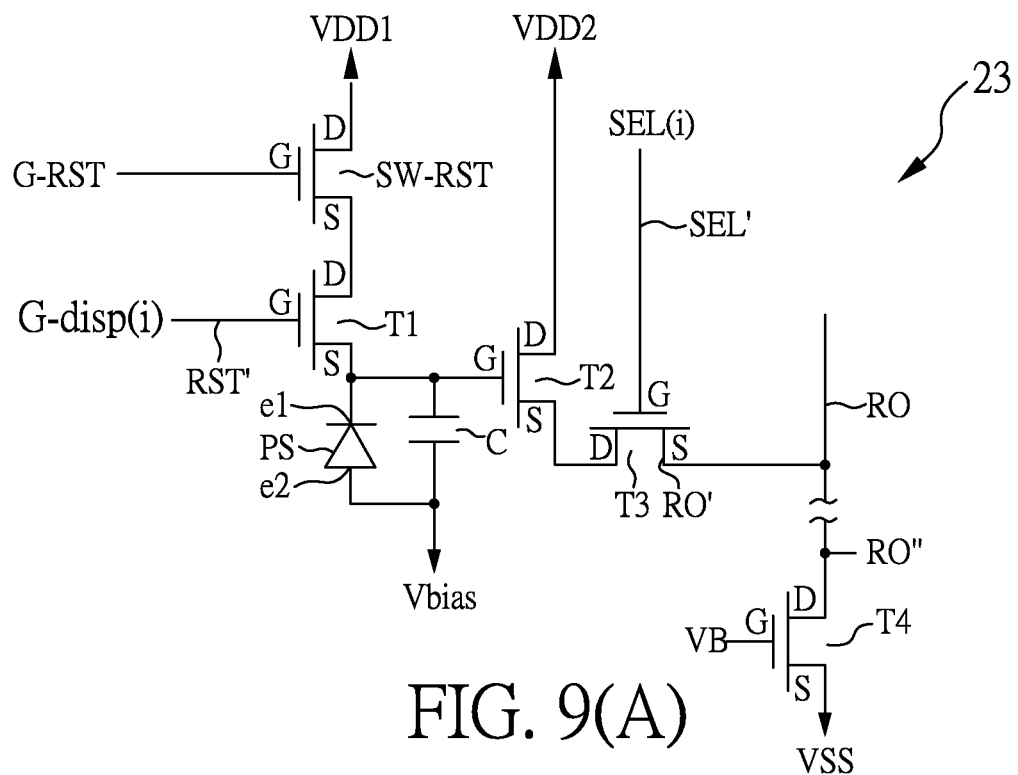
FIG. 9(A) is a circuit diagram of the fingerprint pixel unit of i-th pixel row according to another embodiment of the present disclosure.

FIG. 9(A) is a circuit diagram of the fingerprint pixel unit 23 of the i-th pixel row among the n pixel rows according to another embodiment of the present disclosure. The fingerprint pixel unit 23 has constituent elements similar to the fingerprint pixel unit 21 of FIG. 5(A) except that a reset switch transistor SW-RST is added. As shown in FIG. 11(A), the photo sensor PS has a first end e1, and a second end e2 connected to a bias voltage Vbias. The capacitor C has two ends respectively connected to the first end e1 and second end e2 of the photo sensor PS, wherein the capacitor C may be a capacitor structure formed by internal components of the photo sensor PS. The reset transistor T1 has a first connection end (D), a second connection end (S), and a control end (G) used as the reset end RST' and connected to a corresponding display scan line G-disp, such as the i-th display scan line G-disp (i) among the n display scan lines G-disp shown in the example of FIG. 9(A). The reset switch transistor SW-RST has a first connection end (D), a second connection end (S), and a control end (G) connected to a reset switch control line G-RST, wherein the reset transistor T1 and the reset switch transistor SW-RST are connected in series between the first voltage VDD1 and the first end e1 of the photo sensor PS through respective connection ends. The drive transistor T2 has a control end (G) connected to the first end e1 of the photo sensor PS, a first connection end (D) connected to the second voltage VDD2, and a second connection end (S), wherein the first voltage VDD1 and the second voltage VDD2 can be the same DC voltage source or different DC voltage sources. The select transistor T3 has a control end (G) used as the select end SEL' and connected to a corresponding select line SEL, such as the i-th select line SEL(i) among the n select lines, a first connection end (D) connected to the second connection end (S) of the drive transistor T2, and a second connection end (S) used as the readout end RO' and connected to the readout line RO. In addition, the control end (G) of the load transistor T4 is connected to a fifth voltage VB, and the two connection ends (D, S) thereof are respectively connected to the readout line RO and a sixth voltage VSS. Specifically, the second connection end (S) of the reset transistor T1 is connected to the first end e1 of the photo sensor PS, the first connection end (D) of the reset transistor T1 is connected to the second connection end (S) of the reset switch transistor SW-RST, and the first connection end (D) of the reset switch transistor SW-RST is connected to the first voltage VDD1.

Figure 9B:
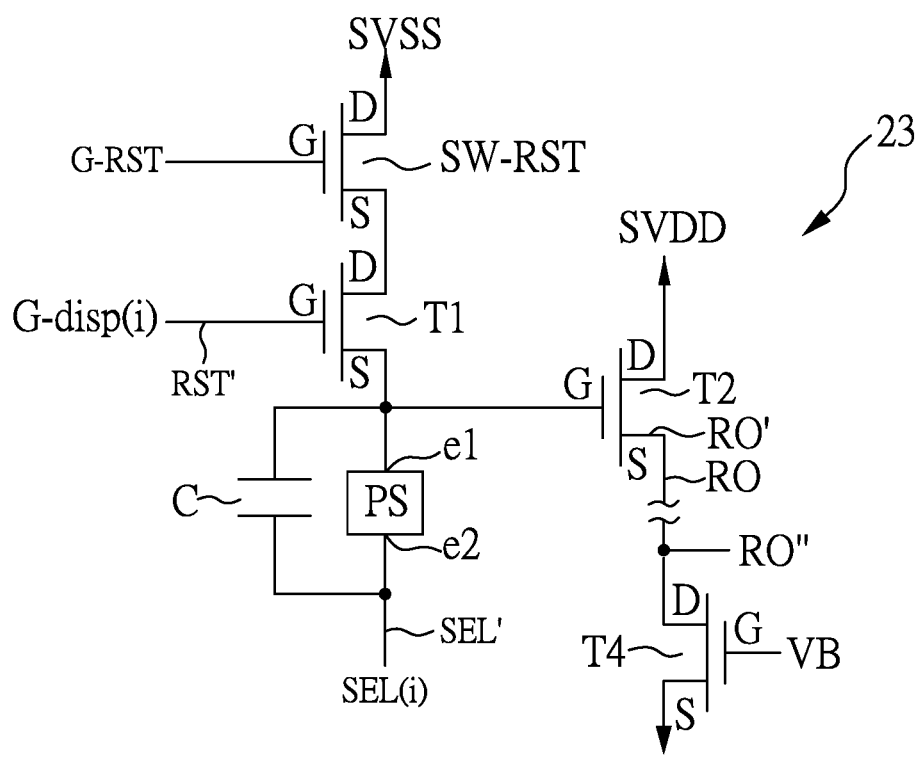
FIG. 9(B) is another circuit diagram of the fingerprint pixel unit of i-th pixel row according to another embodiment of the present disclosure.

FIG. 9(B) is another circuit diagram of the fingerprint pixel unit 23 of the i-th pixel row among the n pixel rows according to another embodiment of the present disclosure. The fingerprint pixel unit 23 has constituent elements similar to those of the fingerprint pixel unit 21 as shown in FIG. 5(B) except that a reset switch transistor SW-RST is added. As shown in FIG. 11(B), the photo sensor PS has a first end e1, and a second end e2 used as the select end SEL' and connected to a corresponding select line SEL, such as the i-th select line SEL(i) among the n select lines shown in the example of FIG. 9(B). The capacitor C has two ends respectively connected to the first end e1 and the second end e2 of the photo sensor PS, wherein the capacitor C may be a capacitor structure formed by internal components of the photo sensor PS, but it is not limited to this. The reset transistor T1 has a first connection end (D), a second connection end (S), and a control end (G) used as the reset end RST' and connected to a corresponding display scan line G-disp, such as the i-th display scan line G-disp(i) among the n display scan lines G-disp shown in the example of FIG. 9(B). The reset switch transistor SW-RST has a control end (G) connected to a reset switch control line G-RST, a first connection end (D), and a second connection end (S), wherein the reset transistor T1 and the reset switch transistor SW-RST are connected in series between the third voltage SVSS and the first end e1 of the photo sensor PS through their respective connection ends. The drive transistor T2 has a control end (G) connected to the first end e1 of the photo sensor PS, a first connection end (D) connected to the fourth voltage SVDD, and a second connection end (S) used as the readout end RO" and connected to the readout line RO. In addition, the control end (G) of the load transistor T4 is connected to the fifth voltage VB, and the first connection end (D) thereof is connected to the readout line RO. Specifically, the second connection end (S) of the reset transistor T1 is connected to the first end e1 of the photo sensor PS, the first connection end (D) of the reset transistor T1 is connected to the second connection end (S) of the reset switch transistor SW-RST, and the first connection end (D) of the reset switch transistor SW-RST is connected to the third voltage SVSS.

Figure 10:
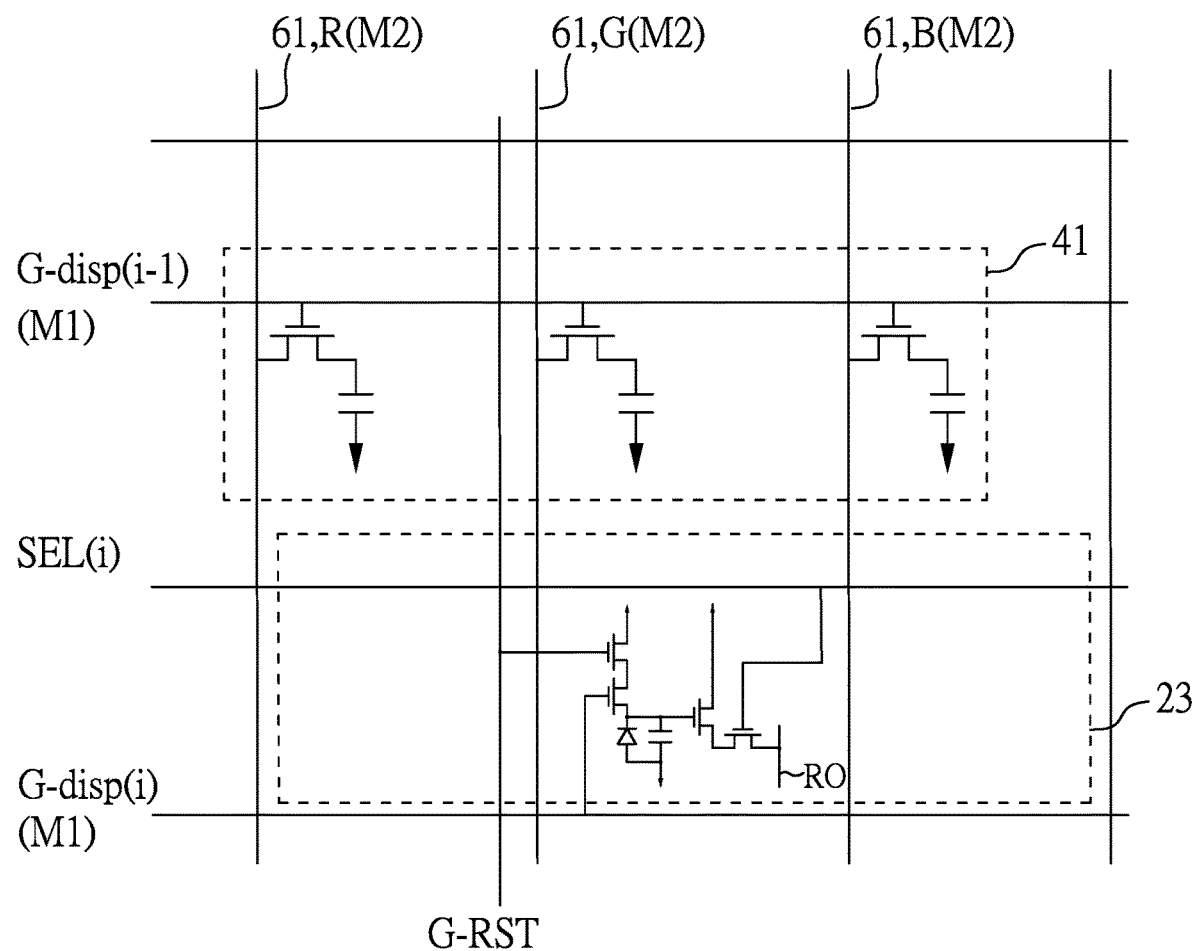
FIG. 10 is a schematic diagram illustrating the fingerprint pixel unit of FIG. 9(A) integrated into the display pixel unit according to the present disclosure.

FIG. 10 is a schematic diagram illustrating the fingerprint pixel unit 23 of FIG. 9(A) integrated into the display pixel unit 41 according to the present disclosure, which shows that the display pixel unit 41 includes three R/G/B sub-pixels of LCD integrated with a fingerprint pixel unit 23. The circuit area of the fingerprint pixel unit 23 is arranged in the area below the three R/G/B sub-pixels, but this is only an example and not a limitation. It is conceivable that the circuit area of the fingerprint pixel unit 23 may be concentrated to be arranged in the area below a specific sub-pixel. In addition, in this embodiment, an LCD panel is taken as an example, but the present disclosure is not limited to this. The present disclosure is also applicable to other types of panels such as OLED, or to other types of pixel arrangements such as RGBW.

In the embodiment of FIG. 10, the LTPS LCD manufacturing process is taken as an example. The display scan lines G-disp and the select lines SEL are made of metal-1 layer (M1). The data lines 61 connected to the three R/G/B sub-pixels are made of metal-2 layer (M2), which are marked as R(M2), G(M2), and B(M2) in FIG. 10. The data lines 61 are provided to send display data to each display sub-pixel. The reset switch control line G-RST is made of metal-0 layer (M0) or metal-3 layer (M3), and is configured to overlap the data line 61, so that the use of the reset switch control line G-RST will not affect the aperture ratio. In addition, the integration of the fingerprint pixel unit 23 of FIG. 9(B) into the display pixel unit 41 of the present disclosure is similar to FIG. 10, and thus a detailed description is deemed unnecessary.

Figure 11:
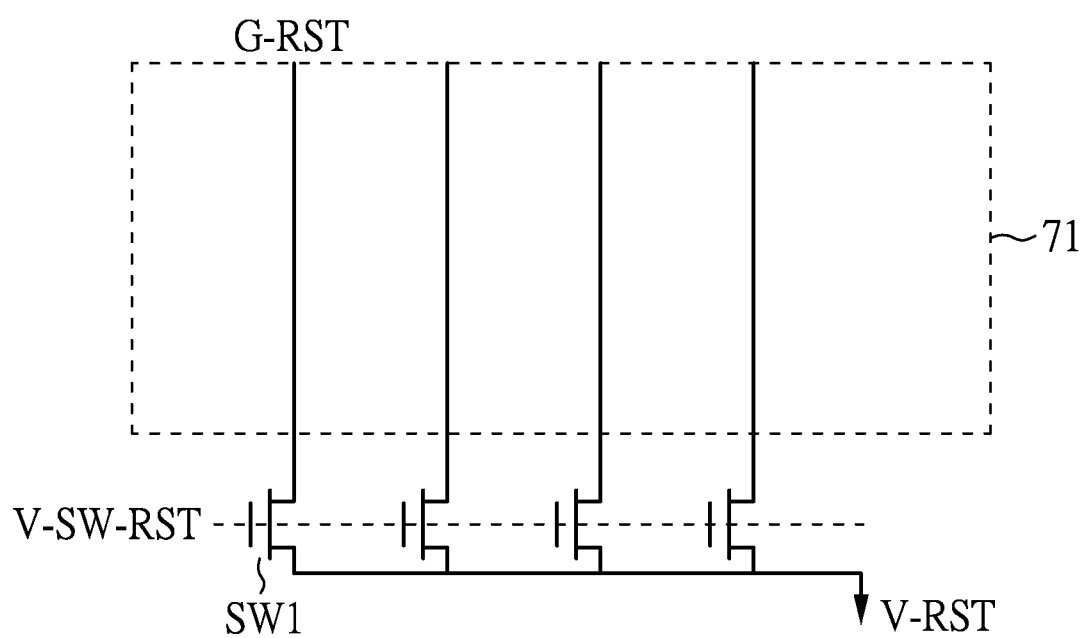
FIG. 11 is a schematic diagram illustrating the reset switch control line in the display area of the panel and its periphery according to the present disclosure.

FIG. 11 shows a schematic circuit diagram of the reset switch control line G-RST in the display area 71 of the panel 31 and its periphery, wherein the reset switch control line G-RST is connected to the reset voltage V-RST through the first switch SW1. For the convenience of control, each first switch SW1 can be connected to the same reset switch control signal V-SW-RST, wherein the reset switch control signal V-SW-RST and the reset voltage V-RST are provided by the integration integrated circuit 39 shown in FIG. 3. Since the reset switch control line G-RST overlaps the data line, when its RC load is large, the first switch SW1 has to be used to avoid influence caused by the load. That is, the first switch SW1 is turned off in the display interval, so that the reset switch control line G-RST becomes floating, and the first switch SW1 is turned on when the fingerprint sensing is activated. If the RC load is within an acceptable range, voltage can be directly applied to the reset switch control line G-RST without arrangement of the first switch SW1.

The operation of using the fingerprint pixel unit 23 of FIG. 9(A) or FIG. 9(B) for display and fingerprint sensing is similar to that of using the fingerprint pixel unit 21 of FIG. 5(A) or 5(B), except that the integration integrated circuit 39 of FIG. 3 is used to turn on or off the reset switch transistor SW-RST through the reset switch control line G-RST so as to further adjust the exposure time accordingly. When the reset switch transistor SW-RST is turned on by the reset switch control line G-RST, the fingerprint pixel unit 23 is operated as if there is no switch transistor reset SW-RST. When the reset switch transistor SW-RST is turned off in, for example, a display interval (DISP) by the reset switch control line G-RST, the reset transistor T1 is inactivated so as to cause the capacitor C to be discharged. Since the added reset switch transistor SW-RST is able to determine whether to reset the storage capacitor C or not, the exposure time can be adjusted.

It can be seen from the above description that the reset line RST and the select line SEL of the optical fingerprint sensor are the main reasons for the reduction of the aperture ratio of the in-cell fingerprint display panel. In the fingerprint display device, and the integration integrated circuit and method for driving the fingerprint display device in accordance with the present disclosure, the reset line can be omitted by multiplexing the display scan line and the reset line, so the aperture ratio of the panel can be effectively improved, and the effect of fingerprint sensing can be achieved at the same time.

The aforementioned embodiments are examples only for convenience of description. The scope of the present disclosure is claimed hereinafter in the claims and is not limited to the embodiments.

What is claimed is:

1. A fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven at least by corresponding n display scan lines and n select lines for performing display and fingerprint sensing, wherein each fingerprint pixel unit has a reset end and a select end, the reset end of the fingerprint pixel unit of i-th pixel row among the n pixel rows is connected to a corresponding display scan line among the n display scan lines, and the select end of the fingerprint pixel unit of the i-th pixel row among the n pixel rows is connected to a corresponding select line among the n select lines, where i is an index value of 1 to n, wherein the fingerprint pixel unit of the i-th pixel row among the n pixel rows comprises:

a reset transistor having a control end used as the reset end and connected to the corresponding display scan line, and a first connection end connected to a first voltage, and a second connection end;

a drive transistor having a control end connected to the second connection end of the reset transistor, a first connection end connected to a second voltage, and a second connection end;

a select transistor having a control end used as the select end and connected to the corresponding select line, a first connection end connected to the second connection end of the drive transistor, and a second connection end;

a photo sensor having two ends respectively connected to the second connection end of the reset transistor and a bias voltage; and a capacitor having two ends respectively connected to the control end of the drive transistor and the bias voltage.

2. The fingerprint display device of claim 1, wherein the second connection end of the select transistor is used as a readout end and connected to a readout line; the readout ends of the fingerprint pixel units in the same column are connected to a load transistor for sharing the load transistor; the load transistor has a control end connected to a fifth voltage, a first connection end connected to the readout line, and a second connection end connected to a sixth voltage.

3. The fingerprint display device of claim 1, wherein the display scan lines and the select lines are driven sequentially; when driving the i-th display scan line among the n display scan lines, the reset transistor of the fingerprint pixel unit of the i-th pixel row among the n pixel rows is turned on to reset voltage level of the capacitor; when driving the i-th select line among the n select scan lines, the select transistor of the fingerprint pixel unit of the i-th pixel row among the n pixel rows is turned on to read fingerprint signal.

4. The fingerprint display device of claim 1, wherein the plurality of pixel units are disposed on a panel, and an integration integrated circuit controls a display driving GOA circuit to sequentially drive the display scan lines for display, and controls a fingerprint sensing driving GOA circuit to sequentially drive the select lines for fingerprint sensing in cooperation with driving of the display scan lines, where sensed fingerprint data is read from the readout line to the integration integrated circuit for performing fingerprint recognition.

5. The fingerprint display device of claim 4, wherein the panel senses touch of a finger and transmits touch signal to the integration integrated circuit so as to provide a touch sensing function.

6. The fingerprint display device of claim 5, wherein, when fingerprint sensing is not activated, display driving and touch sensing are performed on the panel in a time-sharing manner, in which, when performing touch sensing, a full drive signal as same as touch driving signal is sent to the display scan line; when fingerprint sensing is performed and touch sensing is off, display data is updated and the fingerprint pixel unit is reset during a display period, where there is a time interval between the display period and a fingerprint sensing period.

7. The fingerprint display device of claim 5, wherein, when fingerprint sensing is not activated, a full drive signal as same as the touch driving signal is sent to the select line during a touch period; when fingerprint sensing is activated and touch sensing is off, fingerprint data is read during a fingerprint sensing period.

8. The fingerprint display device of claim 1, wherein the display scan lines and the select lines are made of metal-1 layer, and data lines connected to sub-pixels of the display pixel unit are made of metal-2 layer.

9. The fingerprint display device of claim 1, wherein the fingerprint pixel unit of the i-th pixel row among the n pixel rows further comprises:
a reset switch transistor having a control end connected to a reset switch control line, a first connection end, and a second connection end, wherein the reset transistor and the reset switch transistor are connected in series between the first voltage and the first end of the photo sensor.

10. The fingerprint display device of claim 9, wherein the second connection end of the select transistor is used as a readout end and connected to a readout line, the readout ends of the fingerprint pixel units in the same column are connected to a load transistor for sharing the load transistor, the load transistor has a control end connected to a fifth voltage, a first connection end connected to the readout line, and a second connection end connected to a sixth voltage.

11. The fingerprint display device of claim 9, wherein the second connection end of the reset transistor is connected to the first end of the photo sensor, the first connection end of the reset transistor is connected to the second connection end of the reset switch transistor, and the first connection end of the reset switch transistor is connected to the first voltage.

12. The fingerprint display device of claim 9, wherein the reset switch transistor is controlled by the reset switch control line to determine whether the capacitor is reset to adjust exposure time.

13. The fingerprint display device of claim 12, wherein the reset switch control line is connected to a reset voltage through a first switch, and the first switch is connected to a reset switch control signal, where the reset switch control signal and the reset voltage are provided by an integration integrated circuit.

14. An integration integrated circuit for controlling a fingerprint display device having a plurality of pixel rows, in which each pixel row of n pixel rows among the plurality of pixel rows has a plurality of display pixel units and a plurality of fingerprint pixel units, where n is an integer greater than 1, the n pixel rows are driven at least by corresponding n display scan lines and n select lines for performing display and fingerprint sensing, each fingerprint pixel unit has a reset end and a select end, the reset end of the fingerprint pixel unit of i-th pixel row among the n pixel rows is connected to a corresponding display scan line among the n display scan lines, and the select end of the fingerprint pixel unit of the i-th pixel row among the n pixel rows is connected to a corresponding select line among the n select lines, where i is an index value of 1 to n, so as to sequentially drive the display scan lines for performing display, and sequentially drive the select lines for performing fingerprint sensing in cooperation with driving of the display scan lines, wherein the fingerprint pixel unit of the i-th pixel row among the n pixel rows comprises:
a reset transistor having a control end used as the reset end and connected to the corresponding display scan line, and a first connection end connected to a first voltage, and a second connection end;
a drive transistor having a control end connected to the second connection end of the reset transistor, a first connection end connected to a second voltage, and a second connection end;
a select transistor having a control end used as the select end and connected to the corresponding select line, a first connection end connected to the second connection end of the drive transistor, and a second connection end;
a photo sensor having two ends respectively connected to the second connection end of the reset transistor and a bias voltage; and
a capacitor having two ends respectively connected to the control end of the drive transistor and the bias voltage.

15. A fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven at least by corresponding n display scan lines and n select lines for performing display and fingerprint sensing, wherein each fingerprint pixel unit has a reset end and a select end, the reset end of the fingerprint pixel unit of i-th pixel row among the n pixel rows is connected to a corresponding display scan line among the n display scan lines, and the select end of the fingerprint pixel unit of the i-th pixel row among the n pixel rows is connected to a corresponding select line among the n select lines, where i is an index value of 1 to n, wherein the fingerprint pixel unit of the i-th pixel row among the n pixel rows includes:

a reset transistor having a control end used as the reset end and connected to the corresponding display scan line, a first connection end connected to a third voltage, and a second connection end;

a drive transistor having a control end connected to the second connection end of the reset transistor, a first connection end connected to a fourth voltage, and a second connection end;

a photo sensor having a first end connected to the second connection end of the reset transistor, and a second end used as the select end and connected to the corresponding select line; and a capacitor having two ends respectively connected to the control end of the drive transistor and the second end of the photo sensor.

16. The fingerprint display device of 15, wherein the second connection end of the drive transistor is used as a readout end and connected to a readout line; the readout ends of the fingerprint pixel units in the same column are connected to a load transistor for sharing the load transistor; the load transistor has a control end connected to a fifth voltage, a first connection end connected to the readout line, and a second connection end.

17. The fingerprint display device of claim 15, wherein the display scan lines and the select lines are driven sequentially; when driving the i-th display scan line, the reset transistor of the fingerprint pixel unit of the i-th pixel row is turned on to reset voltage level of the capacitor; when driving the i-th select line, power is supplied to the photo sensor of the fingerprint pixel unit of the i-th pixel row among the n pixel rows to increase voltage level of the select end so as to turn on the drive transistor for reading fingerprint signal.

18. The fingerprint display device of claim 15, wherein the plurality of pixel units are disposed on a panel, and an integration integrated circuit controls a display driving GOA circuit to sequentially drive the display scan lines for display, and controls a fingerprint sensing driving GOA circuit to sequentially drive the select lines for fingerprint sensing in cooperation with driving of the display driving lines, where sensed fingerprint data is read from the readout line to the integration integrated circuit for performing fingerprint recognition.

19. The fingerprint display device of claim 18, wherein the panel senses touch of a finger and transmits touch signal to the integration integrated circuit so as to provide a touch sensing function.

20. The fingerprint display device of claim 15, wherein the display scan lines and the select lines are made of metal-1 layer, and data lines connected to sub-pixels of the display pixel unit are made of metal-2 layer.

21. The fingerprint display device of claim 15, wherein the fingerprint pixel unit of the i-th pixel row among the n pixel rows further comprises:

a reset switch transistor having a control end connected to a reset switch control line, a first connection end, and a second connection end, wherein the reset transistor and the reset switch transistor are connected in series between the third voltage and the first end of the photo sensor.

22. The fingerprint display device of claim 21, wherein the second connection end of the drive transistor is used as a readout end and connected to a readout line, the readout ends of the fingerprint pixel units in the same column are connected to a load transistor for sharing the load transistor, and the load transistor has a control end connected to a fifth voltage, a first connection end connected to the readout line, and a second connection end.

23. The fingerprint display device of claim 21, wherein the second connection end of the reset transistor is connected to the first end of the photo sensor, the first connection end of the reset transistor is connected to the second connection end of the reset switch transistor, and the first connection end of the reset switch transistor is connected to the third voltage.

24. The fingerprint display device of claim 21, wherein the reset switch transistor is controlled by the reset switch control line to determine whether the capacitor is reset to adjust exposure time.

25. The fingerprint display device of claim 24, wherein the reset switch control line is connected to a reset voltage through a first switch, and the first switch is connected to a reset switch control signal, where the reset switch control signal and the reset voltage are provided by an integration integrated circuit.

* * * * *